(12) United States Patent
Genik-Sas-Berezowsky et al.

(10) Patent No.: US 6,656,247 B1
(45) Date of Patent: Dec. 2, 2003

(54) SELECTIVE PRECIPITATION OF MANGANESE FROM MAGNESIUM-CONTAINING SOLUTIONS

(75) Inventors: Roman Michael Genik-Sas-Berezowsky, St. Albert (CA); John Stiksma, St. Albert (CA)

(73) Assignee: Dynatec Corporation, Fort Saskatchewan (CA)

( * ) Notice: Subject to any disclaimer, the term of this patent is extended or adjusted under 35 U.S.C. 154(b) by 0 days.

(21) Appl. No.: 10/215,384

(22) Filed: Aug. 8, 2002

(51) Int. Cl.$^7$ ................................................ C22B 3/20
(52) U.S. Cl. .......................................... 75/710; 423/50
(58) Field of Search ............................... 75/710; 423/50

(56) References Cited

U.S. PATENT DOCUMENTS

| | | | |
|---|---|---|---|
| 4,025,430 A | 5/1977 | Pagel | 210/53 |
| 4,198,377 A | 4/1980 | Burkin et al. | 423/50 |
| 5,534,234 A | 7/1996 | Reddin et al. | 423/50 |
| 6,280,630 B1 * | 8/2001 | Ramsay | 210/711 |

FOREIGN PATENT DOCUMENTS

| | | | |
|---|---|---|---|
| GB | 1008196 | 10/1965 | |
| GB | 2015492 A | 9/1979 | C01G/45/02 |
| JP | 2000-234130 | 8/2000 | C22B/3/04 |
| WO | WO 99/06603 | 2/1999 | C22B/3/20 |

OTHER PUBLICATIONS

"Removal of Heavy Metals from Wastewaters: the Latest Techniques" Canadian Mining Journal, Mar. 1980, pp. 64–69 (author anonymous).

Feng, D. et al., "Treatment of Acid Mine Water by use of Heavy Metal Precipitation and Ion Exchange" (2000) Minerals Engineering, vol. 13, No. 6, p. 623–642.

Ferron, C.J. "The Control of Manganese in Acidic Leach Liquors, with Special Emphasis to Laterite Leach Liquors" presented at ALTA 200, Nickel/Cobalt–8, Perth, Australia, May 21, 2002.

Grassi, R. et al., "Cawse Nickel Operations Process Description and Production Ramp Up" presented at ALTA 2000, Nickel/Cobalt–6, Perth Australia, May 15–18, 2000.

Hill, R.D. and R.C. Wilmoth, "Limestone Treatment of Acid Mine Drainage" (Jun., 1971) Society of Mining Engineers, AIME vol. 252, pp. 162–166.

Kuit, W.J., "Mine and tailings effluent treatment at the Kimberley, B.C. operations of Cominco Ltd." CIM Bulletin, Dec. 1980, pp. 105–112.

Kuyucak, N., "Conventional and New Methods for Treating Acid Mine Drainage" proceedings of CAMI '95 Conference, Oct. 22 to 25, 1995, Montreal, Quebec.

Larsen, H.P., and L.W. Ross, "Two–stage process chemically treats mine drainage to remove dissolved matals" (Feb., 1976) EIMJ pp. 94–96.

Mason, P., and M. Hawker, "Ramu Nickel Process Piloting" presented at ALTA 1998, Nickel/Cobalt Pressure Leaching & Hydrometallurgy Forum, Perth Australia, May 25–27, 1998.

McLaughlin, R.J. et al., "A Comparison of Selected Acid Mine Drainage Treatment Processes" Preprint 96–145, SME Annual Meeting, Phoenix, Arizona, Mar. 11 to 14, 1996.

Mezei A., et al., "Production of Nickel from Autoclave Leach Solutions using the Ammoniacal route—Ramu Project integrated Pilot Plant Operation Results" presented at ALTA 1999, Nickel/Cobalt Pressure Leaching & Hydrometallurgy Forum, Perth, Australia, May 1999.

Monhemius, A.J., "Precipitation diagrams for metal hydroxides, sulphides, or arsenates and phosphates" Transactions of Institution of Mining and Metallurgy, Dec. 1997, pp. C 202–C 206.

Stanley, R.W. et al., "Advanced Treatment Technologies for Metallurgical Effluents" (1996) paper presented at the CANMET/EC Joint Workshop on Mining, Mineral Processing and Recycling, Lisbon, Portugal, Sep. 16–17.

* cited by examiner

*Primary Examiner*—Melvyn Andrews
(74) *Attorney, Agent, or Firm*—Greenlee, Winner and Sullivan, P.C.

(57) ABSTRACT

A process is provided for selectively precipitating and removing manganese relative to magnesium from an acidic solution, preferably barren of one or more of cobalt, nickel, copper and zinc, but containing appreciable amounts of manganese, magnesium, and aluminum. The process comprises a) adding a first alkaline reagent, for example lime and/or limestone, to neutralize the acidic solutions and to precipitate a majority of the aluminum as aluminum-containing solids, without precipitating a substantial amount of the magnesium; b) removing the precipitated aluminum-containing solids to create an aluminum-depleted solution; c) adding a second alkaline reagent, for example lime, to the aluminum-depleted solution and aerating for a sufficient retention time to preferentially precipitate a majority of the manganese as manganese-containing solids; and d) removing the precipitated manganese-containing solids. By first precipitating and removing aluminum, the process allows for selective precipitation of manganese relative to magnesium without significant co-precipitation of magnesium, thus resulting in a savings of the total amount of the first and second alkaline reagents needed to precipitate the majority of the manganese (compared to that needed without first precipitating and removing the majority of the aluminum).

30 Claims, No Drawings

SELECTIVE PRECIPITATION OF MANGANESE FROM MAGNESIUM-CONTAINING SOLUTIONS

FIELD OF THE INVENTION

The present invention relates to the efficient and selective precipitation of manganese, from magnesium-containing solutions. More particularly, the invention relates to the removal of manganese from, for example, laterite ore waste solutions which are substantially barren of one or more of cobalt, nickel, copper and zinc, but which contain magnesium, manganese and aluminum.

BACKGROUND OF THE INVENTION

Mining and milling operations generate various types of toxic, metal containing effluents which require treatment prior to discharge to the environment. These effluents include, for example, acid mine drainage, mill tailings excess decant water, seepages, and acidic process waste streams. The most common of these is acid mine drainage, characterized by acidity (sulphuric) and metals, which may include aluminum, cadmium, chromium, cobalt, copper, iron, lead, magnesium, manganese, nickel, zinc and others.

The processing of nickeliferous lateritic ores by sulphuric acid leaching has gained considerable interest in recent years, with three commercial plants based on high temperature acid leaching coming on stream in Western Australia in the late 1990s. A number of similar operations are at various stages of development, throughout the world. The process generates acidic product liquors, containing nickel and cobalt, as well as most of the afore mentioned metals, as impurities. In addition, the product liquors contain significantly higher concentrations of manganese and magnesium, particularly relative to their concentrations usually encountered in acid mine drainage.

Various methods are used and have been proposed for recovery of the nickel and cobalt from such leach liquors. These fall into three general categories, including precipitation as sulphides, precipitation as hydroxides (to produce intermediates for subsequent refining) and direct solvent extraction. Most of these options require removal of at least some of the metal impurities prior to recovery of the nickel and cobalt. Recovery of the latter by sulphide precipitation requires prior neutralization of the acid but, because sulphide precipitation is relatively selective for the base metals, may require little or no prior removal of metal impurities. Recovery by the other alternatives also requires prior neutralization of the acid and removal and/or reduction of some of the metal impurities, such as aluminum, chromium and iron before recovery of the nickel and cobalt. Regardless of the method of recovery of the valuable metals, the barren or waste solution will still contain varying and variable concentrations of toxic impurities. In addition, some of the recovery alternatives for the nickel and cobalt may involve a co-extraction or co-precipitation of some of the metal impurities, which are removed or rejected at a later stage in the process, as a secondary waste or effluent stream which, in most instances, is recombined with the major effluent stream.

The most common and effective way of dealing with acidic metal containing effluents prior to discharge of the treated water to the local waterways is neutralization of the acid and precipitation of the dissolved metals as hydroxides, using suitable alkaline reagents. Lime is most commonly used as the neutralizing/precipitating reagent, because of its high reactivity, availability, and relatively low cost. Alternatively, the sequential use of limestone, to pH 5 to 6, in a first stage, to precipitate the bulk of the aluminum, chromium and iron, followed by lime, to pH 8 to 10, to precipitate the remaining metals, may be preferred. Depending on the environmental regulations, which are usually site-specific and may vary considerably from site to site, the treatment with the combination of limestone and lime, or by lime alone, may be adequate for meeting the requirements for the treated water. Air is frequently used during the neutralization, to oxidize ferrous iron to ferric and, when using limestone in the first stage of neutralization, to remove the generated carbon dioxide prior to the addition of lime.

A treatment to a pH range of 7 to 8 is generally sufficient for removal of most of the impurities to acceptable levels. One exception, however, is manganese. According to one reference (N. Kuyucak, "Conventional and New Methods for Treating Acid Mine Drainage," proceedings of CAMI '95 Conference, Oct. 22 to 25, 1995, Montreal, Quebec), removal of the manganese requires strong oxidation followed by liming at pH greater than 10. Many of the effluents also contain appreciable concentrations of magnesium, however, and neutralization to such high pH levels also results in precipitation of the magnesium, which is generally not categorized as toxic nor whose removal is required. For example, McLaughlin et al, in a paper entitled "A Comparison of Selected Acid Mine Drainage Treatment Processes" (Preprint 96–145, SME Annual Meeting, Phoenix, Ariz., March 11 to 14, 1996) state that to remove manganese to low levels in a reasonable period of time (pH approximately 10.5), a significant portion of the magnesium present will also precipitate. This is further illustrated in a paper by Feng et al, entitled "Treatment of Acid Mine Water by Use of Heavy Metal Precipitation and Ion Exchange" (Minerals Engineering, Vol. 15, No. 6, pp. 623 to 642, 2000). In their work, acid mine water, containing a wide range of metals, including 113 ppm Mn and 359 ppm Mg, was treated with lime to precipitate the metals. By pH 9.1, the Mn had been precipitated to 15.7 ppm, without appreciable co-precipitation of Mg. Further liming, to pH 10.1 had lowered the Mn concentration to 2.6 ppm, but with co-precipitation of about 60% of the Mg, to 143 ppm. By the time the Mn had been removed to 1.1 ppm, the co-precipitation of the Mg had been even more complete, to 0.5 ppm. Thus, additional reagent had to be added to precipitate the Mg with the Mn to get the Mn concentration to the required levels. In instances where removal of magnesium is not required and/or where more effective and selective removal of the Mn is required, the alternative treatments which have been adopted have included the use of strong chemical oxidants or the use of sulphiding reagents.

Laterite ore leach solutions and the resultant waste solutions, after recovery of the nickel and cobalt, are characterized by high concentrations of most impurity metals-relative to typical concentrations in most acid mine waters and other mining and milling wastes. For example, the barren solutions may contain from 0.5 to 5 g/L Mn, and from 3 to 50 g/L Mg, depending on the ore type treated, and the extent of solution recycling within the processing plant. Environmental regulations for plant effluents vary considerably, depending on the nature of the receiving waters, location and a number of other factors. In many locations, the discharge of magnesium containing solutions is allowed, whereas prior removal of manganese to trace levels is required. The allowable manganese level may range from several tens of mg/l, to 1 mg/l or less, depending on the site. Although, as noted earlier, the selective removal of manganese might be accomplished by the use of strong oxidants or of sulphiding reagents, the relatively high concentrations and quantities of manganese in laterite leach effluents would tend to make these alternatives economically unattractive or prohibitive. The ability to effect an extensive and selective removal of the manganese, to trace levels, in the presence of appreciable concentrations of magnesium with inexpensive reagents such as lime would, therefore, be highly desirable.

SUMMARY OF THE INVENTION

The present invention provides a process for selective removal of manganese from acidic waste solutions which are preferably substantially barren of one or more of cobalt, nickel, copper and zinc, but which contain manganese, magnesium and aluminum (and possibly other metals, such as iron and chromium), without unnecessary co-precipitation of magnesium. The process not only enables the use of inexpensive reagents, such as lime, it also requires a reduced amount of reagent to precipitate manganese effectively.

Conventional precipitation of environmentally sensitive metals such as Al, As, Cd, Cr, Co, Cu, Fe, Ni, Zn and, especially, Mn, from effluent streams, using lime or sequential limestone and lime is technically feasible. However, as noted above, in solutions also containing magnesium, the removal of the manganese to trace levels typically results in the unavoidable co-precipitation of a significant portion of the magnesium, thereby increasing lime requirements to between five and ten times those required for the manganese alone. When metals are removed from a waste stream, the precipitated solids resulting from treatment to remove the metals, such as manganese, become solid waste that must also be handled. Thus, any unnecessarily precipitated magnesium not only increases the amount of reagent required for manganese removal, it also adds to the quantity of waste solids. Also, since manganese is often removed from waste streams for the purpose of decontaminating the waste solution put into the environment, rather than for the recovery of manganese, the use of more expensive treatment methods, such as the use of chemical oxidants or sulphiding reagents, is not economical. Thus, the inventors recognized the need for a selective method of manganese precipitation using inexpensive reagents.

It has been discovered that the prior precipitation and physical removal of a majority of aluminum enables an efficient and highly selective precipitation of the manganese, with minimal co-precipitation of the magnesium, thereby saving appreciably on the lime requirements.

Based on published information on the solubility of metal hydroxides (Log $K_s$ for Mn—12.7, Mg—11.3) it was believed that there should be some scope for the selective precipitation of manganese, relative to magnesium. Specifically, Monhemius ("Precipitation Diagrams for Metal Hydroxides, Sulphides, Arsenates and Phosphates," Trans. IMM, December 1977, C202 to C206.) shows that manganese should, theoretically, precipitate at a lower pH than magnesium and thus, precipitation at this pH should be selective for manganese. However, in practice, and as demonstrated herein, selective precipitation does not occur. Without being limited to such, it is believed that magnesium precipitates with manganese when a highly reactive reagent is used, such as lime, partly because the reagent does not distinguish between the two metals, given that they become insoluble at relatively close pH levels. It is possible that areas of localized pH are formed that are higher than the level at which magnesium becomes insoluble and, as such, it is difficult to selectively precipitate manganese without magnesium. Thus, recognizing the difficulties, the inventors performed several tests to find a method of either effecting selectivity, or of reducing the reagent requirements to remove manganese. Several series of tests were conducted to evaluate the possibility of selective precipitation of manganese and its limitations. The tests were conducted on a wide range of solutions, most of them generated in continuous pilot plant leach operations on a variety of laterite ore feeds, after nickel and cobalt recovery from the leach solutions by sulphide precipitation.

The barren solutions, used in the tests demonstrated in Examples 1 to 3 and 5 to 7, contained 0.6 to 5.9 g/l Al, 0.1 to 0.6 g/l Cr, 0.1 to 1.8 g/l Fe, 3.3 to 19.6 g/l Mg, and 1.4 to 3.5 g/l Mn, as the major metal ion components. The neutralization and metal hydroxide precipitation tests were conducted with lime and limestone/lime combinations as the alkaline reagent, in both batch and continuous mode, using both single point and staged addition of the alkaline reagents, and on both barren solutions and on slurries of barren leach solids and barren solution.

The results of the tests using usual prior art neutralization methods, as demonstrated in Examples 1 to 3, showed that treatment with lime, or the sequential treatment with limestone and lime was effective in precipitating the manganese to <5 mg/l, even from the high magnesium-containing solutions and systems. However, this was at the expense of the co-precipitation of a significant proportion of the magnesium, such that the lime requirements for the removal of the manganese to trace levels were from 5 to 10 times the stoichiometric amount for manganese alone. For example, removal of the manganese from a solution containing 1.58 g/l Mn and 17.2 g/l Mg, to <10 mg/l Mn, as described in Example 1, resulted in the co-precipitation of almost 7 g/l Mg. Thus Examples 1 to 3 confirm the conclusions of the prior art, which indicated that complete removal of the manganese as a hydroxide or hydrated oxide resulted in significant precipitation of the magnesium.

A more extensive study was then undertaken, using both synthetic and actual barren solutions produced in the acid leaching of several laterite ores, to examine possible means of improving the selectivity of manganese precipitation relative to magnesium, as a hydroxide or hydrated oxide. These studies, as described in Examples 4 to 11, established, unexpectedly, that the presence of aluminum in the precipitation system adversely affected the ability to effect the selective precipitation of manganese. It was found that prior precipitation and physical removal of a majority of the precipitated aluminum species (aluminum-containing solids) enabled subsequent complete and highly selective precipitation of the manganese in the presence of magnesium. Without being bound by such, it appears that, in such systems, the addition of the lime reagent results in the precipitation of a mixture of magnesium and manganese hydroxides but, surprisingly, with sufficient retention time, the magnesium hydroxide exchanges for remaining dissolved manganese, with precipitation of the manganese, and re-dissolution of the magnesium. In the presence of precipitated aluminum, however, it appears that the aluminum, possibly due to its amphoteric nature, in some manner inhibits reaction of the precipitated magnesium hydroxide with the remaining soluble manganese, and necessitates the addition of large and excessive amounts of lime, resulting in precipitation of both the manganese and appreciable magnesium. These effects are illustrated in the provided examples.

Broadly stated, the invention provides a process for selectively precipitating and removing manganese from an acidic solution, preferably substantially barren of one or more of cobalt, nickel, copper and zinc, but containing manganese, magnesium, and aluminum, comprising:

a) adding a first alkaline reagent to neutralize the acidic solutions and to precipitate a majority of the aluminum as aluminum-containing solids, without precipitating a substantial amount of the magnesium;

b) removing the precipitated aluminum-containing solids to create an aluminum-depleted solution;

c) adding a second alkaline reagent to the aluminum-depleted solution and aerating for a sufficient retention time to preferentially precipitate a majority of the manganese as manganese-containing solids; and d) removing the precipitated manganese-containing solids.

By "barren", as used herein and in the claims, is meant that certain metals (usually one or more of cobalt, nickel, copper and zinc) have already been removed from a solution, down to trace or non-useful levels. Generally, these levels will be less than about 50 mg/l, more usually in the range of 5–30 mg/l.

By "majority", as used herein and in the claims is meant more than 50%. More preferably, for aluminum, an amount greater than 90% is removed, and for manganese, an amount greater than 95% is removed.

The tests were performed with the acidic solutions over the general temperature range of 23 to 85° C., to simulate expected application temperatures. In laterite pressure leaching processes barren solutions are generally treated in the first stage at 80° C. or higher. When the process combines the barren solution with washed leach residue solids before final neutralization, the neutralization usually occurs at a temperature closer to ambient. The process was tested at 40° C. to simulate the usual solution temperature in a warm southern climate. However, it is anticipated that the process is applicable at a much broader range of temperatures, such as 23 to 95° C., and with 40 to 80° C. being the more preferred range.

DETAILED DESCRIPTION OF PREFERRED EMBODIMENTS

The preferred embodiment of the invention is a process used to remove metals from an acidic waste solution from, for example a laterite ore leaching process, wherein the acidic waste solution is barren of one or more of cobalt, nickel, copper and zinc, most preferably barren of cobalt and nickel, but contains magnesium, manganese and aluminum, and possibly other metals such as iron and chromium. Generally, the acidic waste stream to be treated is in the temperature range from 40 to 80° C.

Generally, tie waste stream to be treated includes metals in the following ranges: magnesium 3.0 to 50 g/l; manganese 0.5 to 5.0 g/l, aluminum 0.5 to 8.0 g/l; iron 0 to 5.0 g/l; and chromium 0 to 1.5 g/l.

In the process of the invention, a first alkaline reagent is added to neutralize the acidic solution and to precipitate a majority of the aluminum as aluminum-containing solids. These solids are then removed to create an aluminum-depleted solution. Next, a second alkaline reagent is added to the aluminum-depleted solution, with aeration for a sufficient retention time to preferentially precipitate a majority of the manganese as manganese-containing solids. These manganese-containing solids are then removed from the solution.

The pH level achieved with the addition of the first alkaline reagent (sometimes referred to herein as acid neutralization or the first stage of metal precipitation) should be in the range of 3.5 to 7.0, more preferably in the range of 4.0 to 5.5, in order to precipitate a majority of the aluminum as aluminum-containing solids without precipitating a substantial amount of the magnesium. At these pH ranges, magnesium remains largely in solution such that co-precipitation of magnesium is not substantial (preferably less than 10% and more preferably less than 2% by weight). These solids are then removed from the solution by any known solids/liquid separation technique such as filtration. The process is capable of reducing the aluminum to less than 0.5 g/l, more preferably to less than about 0.1 g/l.

After removal of the precipitated solids from the treated solution, a second alkaline reagent is added to achieve a pH level, for the second stage of metals precipitation, in the range of 7.0 to 9.0, more preferably in tie range of 7.5 to 8.5.

Preferred first alkaline reagents are reagents which provide one or more of an oxide, hydroxide or carbonate of one or both of calcium or magnesium. Table A below shows typical reagents to supply these species, with one or both of limestone and lime being most preferred.

Preferred second alkaline reagents are those which provide one or more of an oxide or hydroxide of one or both of calcium or magnesium, or sodium carbonate or sodium hydroxide. Table A below shows typical reagents to supply these species, with lime being most preferred.

The first and second alkaline reagents may be added as solutions, depending in part on their solubilities, as aqueous slurries or other streams containing these reagents, or they may be added as powdered reagents. It should be understood that this first and second alkaline reagent list below is meant to include powdered reagents, as well as aqueous slurries, solutions or other streams which contain one or more of the oxide, hydroxide or carbonate species listed below.

TABLE A

| Species Provided | Exemplary Reagent |
| --- | --- |
| CaO | calcium oxide, lime, quick lime |
| $Ca(OH)_2$ | calcium hydroxide, hydrated lime, calcium hydrate, slaked lime, caustic lime |
| $CaCO_3$ | calcium carbonate, calcite, limestone, aragonite, chalk, calcrete |
| $CaCO_3.MgCO_3$ or $CaMg(CO_3)_2$ | calcium, magnesium carbonate, dolomite |
| MgO | magnesium oxide, magnesia |
| $Mg(OH)_2$ | magnesium hydroxide |
| $MgCO_3$ | magnesium carbonate |
| $Na_2CO_3$ | sodium carbonate |
| NaOH | sodium hydroxide |

The process of die present invention has been demonstrated to be operative at atmospheric pressure, and can be conducted at temperatures in the range of 23 to 95° C., but is more preferably conducted at temperatures in the range of 40 to 80° C.

The process of this invention has the major advantage of accomplishing the selective precipitation of manganese (over magnesium) to remove more of die manganese, with less consumption of the total of the first and second alkaline reagents, than would be needed without the aluminum precipitation and removal step.

In a preferred step of the process, tie first step of adding die first alkaline reagent is accomplished with aeration or gas sparging to dispel any formed carbon dioxide and/or to oxidize any ferrous iron. This step is most beneficial when the first alkaline reagent is a carbonate reagent. If it is desired to oxidize the ferrous iron, aeration is preferred with air or other oxygen-containing gases, rather than sparging with other gases.

Alternatively, when acidic solutions contain ferrous iron, it may be beneficial to allow at least a portion of the ferrous iron to proceed through to the second metal precipitation step to be co-precipitated with the manganese-containing solids, since there is evidence that the ferrous iron appears to improve the subsequent precipitation of the manganese.

In the examples that follow, particularly Example 6, further preferred operating conditions have been discovered. A test series on aluminum-free manganese-magnesium sulphate solution showed that the addition of lime initially precipitated a mixed Mn-Mg oxide aid hydroxide, some of which was identified by X-ray diffraction analysis as $MgMn_2O_4$ ($MgO \cdot Mn_2O_3$). With extended time and aeration, the precipitated magnesium exchanged with die remaining soluble manganese, removing it to trace levels. Higher temperatures promoted more rapid and more complete precipitation. With 150% of the stoichiometric requirement of lime for the Mn (initially 1.9 g/L), the manganese was removed to about 1.5 mg/L, within 2 h at both 80° and 50° C., whereas at 27° C., the Mn was precipitated only to 480 mg/L, by 2 h, and 110 mg/L, by 6 h. With 200% of stoichiometric lime, at 27° C., the Mn was removed to 210 and 26 mg/L by 2 and 6 h, respectively. The addition of an oxidant, preferably air, was important at all temperatures, as without it, there was no further precipitation of manganese over that in the initial Mu-Mg oxide or hydroxide just after the lime addition.

A test series with aluminum-containing solutions, with limestone precipitation of the aluminum followed by the lime precipitation of the manganese without an intermediate solids/liquid separation stage to remove the precipitated aluminum-containing solids, established a strong dependence of lime requirements for complete manganese removal on the initial aluminum concentration in the feed solutions. With 1, 3 and 5 g/l Al in the feed, lime requirements for effective removal of die manganese increased to about 415, 750 and 1,230% of the stoichiometric requirement based on the concentration of manganese, as increasingly more of the magnesium was co-precipitated, but was not effective in removing the remaining manganese. At the point at which the manganese had been precipitated to <5 mg/L, the Mg:Al molar ratio in die corresponding solids was almost 2:1. This suggested that much of the magnesium which was initially precipitated had been tied up as a complex by the aluminum.

Manganese precipitation tests with lime were also conducted on a slurry comprising aluminum-free solution and aluminum-containing washed laterite leach residue, at 50 and 80° C. The aluminum in die solids, present predominantly as alunite which had been precipitated under autoclave conditions, was only slightly deleterious in the precipitation of the manganese, the effect being greater at the higher temperature. This would suggest decomposition of some of the alunite at 80° C. (more so than at 50° C.), but the interference was considerably less than that by an equivalent amount of atmospherically-precipitated aluminum.

Manganese precipitation tests were also conducted in the presence of chromium and iron; neither of these metals had the interfering effect displayed by aluminum In fact, iron, particularly ferrous iron, proved beneficial. When processing actual waste solutions, therefore, it may be advisable to retain some of the ferrous iron in solution during die limestone precipitation and removal of aluminum, to enhance the subsequent selective precipitation of the manganese.

EXAMPLES

The following examples illustrate the effects of magnesium on manganese precipitation, and die discovered effects of other metals, most notably aluminum, on the selective precipitation of manganese over magnesium.

Examples 1, 2 and 3 show that the traditional or conventional methods of precipitating metals from waste solutions or slurries using lime or the combination of limestone and lime are effective for removal of most of the metals to trace levels with economic and efficient utilization of the reagents. However, removal of the manganese in the presence of magnesium requires a large excess of reagent above that theoretically required for the manganese, because of the non-selectivity, and the unavoidable precipitation of major amounts of magnesium.

Examples 4 to 11 demonstrate background experiments in deriving the invention and evidence of operability.

Example 1

A batch neutralization, metal-precipitation test was conducted on an acidic waste slurry from the sulphuric acid pressure leaching of a laterite ore. The slurry comprised a mixture of barren solution—following base metals (Ni, Co, Cu and Zn) removal and recovery from the ore leach liquor by sulphide precipitation, and washed laterite leach residue, assaying (%) 1.9 Al, 2.8 Ca, 1.9 Cr, 45.6 Fe, 0.2 Mg, 0.25 Mn, 10.8 SiO, and 3.9 S. The chemical composition of the solution component of the waste slurry was (g/l) 2.0 Al, 0.1 Cr, 0.4 Fe (0.27 $Fe^{2+}$), 17.5 Mg and 2.58 Mn.

The test was conducted at 80° C., with mechanical agitation, an(d with aeration of the slurry. In the first phase of the test, an aqueous slurry of calcium carbonate (limestone) was added incrementally, to a pH of 6.1. The composition of the resultant solution component of the slurry was (g/l):<0.05 Al, <0.003 Cr, 0.012 Fe, 17.2 Mg, and 1.58 Mn, indicating precipitation of most of the Al, Cr and Fe, essentially none of the Mg, and almost 40% of the Mn. In the second phase of the test, an aqueous slurry of calcium oxide (lime) was added, incrementally, to the entire slurry from the limestone treatment, allowing for 30 min retention before sampling and addition of the next increment of lime. The results of the liming portion are given in Table 1.

TABLE 1

| CaO addition, g/l | 1.36 | 2.80 | 4.16 | 5.67 | 7.12 | 8.55 | 10.0 | 11.4 |
|---|---|---|---|---|---|---|---|---|
| CaO, % stoich. for | | | | | | | | |
| Mn* | 52 | 106 | 158 | 216 | 270 | 325 | 378 | 432 |
| Mn** | 84 | 174 | 258 | 352 | 441 | 530 | 620 | 704 |
| Total time, min | 30 | 60 | 90 | 120 | 150 | 180 | 210 | 240 |

TABLE 1-continued

| Solutions | | | | | | | | |
|---|---|---|---|---|---|---|---|---|
| pH(23° C.) | 6.96 | 7.0 | 7.01 | 7.29 | 7.54 | 7.82 | 7.82 | 8.07 |
| mg/l Mn | 1330 | 1060 | 831 | 576 | 322 | 99 | 28 | 6 |
| g/l Mg | 17.0 | 15.6 | 15.0 | 14.1 | 13.4 | 11.8 | 11.7 | 10.4 |

*based on Mn content of initial, untreated slurry
**based on remaining Mn in solution after limestone treatment The treatment of the slurry with lime, to pH 8, was effective in removing the manganese to <10 mg/l. However, this was at the expense of a very large excess of lime (seven times the theoretical amount for die Mn remaining in solution after the limestone addition) due to tie unavoidable co-precipitation of a significant portion of the magnesium. Thus, the precipitation of the remaining 1.6 g/l Mn with lime was accompanied by the corresponding precipitation of more than 6 g/l Mg.

Example 2

The test as in Example 1 was repeated, except that a slurry of lime was used as the sole neutralizing and metals precipitation reagent. Once again, the manganese was precipitated to <10 mg/l, but at die expense of a large excess of lime, and with even less selectivity relative to magnesium than in die preceding test. Removal of die manganese to 16 mg/l resulted in the co-precipitation of almost 9 g/l of magnesium; further removal of the Mn, to 3 mg/l, precipitated a total of 10 g/l Mg, such that the resultant solution contained 3 mg/l Mn and 6.7 g/l Mg.

Example 3

A barren acidic laterite leach solution, following base metals removal by sulphide precipitation, was treated in a continuous circuit for acid neutralization and metals precipitation, this time in the absence of the leach residue. The chemical composition of the solution, which contained appreciably less magnesium but more aluminum than the preceding solution, was (g/l) 5.6 Al, 0.62 Cr, 0.02 Co, 0.0005 Cu, 0.53 Fe ($Fe^{2+}$), 3.34 Mg, 1.86 Mn, 0.08 Ni, 0.03 Zn and 8.7 $H_2SO_4$. The circuit comprised six mechanically agitated tanks in series, with limestone addition to the first two tanks, and lime addition to the fourth and fifth tanks. Air was sparged into the first five tanks. The operation was conducted in the temperature range 83 to 86° C., with a nominal solution retention time of 164 minutes.

Limestone addition throughout the run was maintained in the 53 to 55 g/l range, whereas the lime addition was staged, from 3.3 to 12.6 g/l. The terminal pH values of the treated solutions (measured at 23° C.) ranged from 7.30 to 8.51, by which the Cr, Co, Cu, Fe, Ni and Zn had been precipitated to <0.2 mg/l. Aluminum had been precipitated to 0.1 mg/l by pH 7.3, but its concentration had increased to 1.3 mg/l by pH 8.5. The circuit profile compositions for manganese and magnesium are given in Table 2.

TABLE 2

| CaO add'n g/l | CaO stoich % for Mn | | Limestone | | | Lime | | |
|---|---|---|---|---|---|---|---|---|
| | | | Tank 1 | Tank 2 | Tank 3 | Tank 4 | Tank 5 | Tank 6 |
| 3.3 | 184 | pH | 3.87 | 6.57 | 7.06 | 7.46 | 7.39 | 7.30 |
| | | mg/l Mn | 1750 | 1130 | 813 | 282 | 284 | 284 |
| | | mg/l Mg | 3840 | 3830 | 3870 | 2820 | 2810 | 2780 |
| 6.5 | 366 | pH | 3.92 | 6.56 | 7.02 | 7.39 | 7.37 | 7.39 |
| | | mg/l Mn | 1740 | 1230 | 859 | 139 | 138 | 145 |
| | | mg/l Mg | 3860 | 3870 | 3810 | 1770 | 1620 | 1660 |
| 8.1 | 473 | pH | 3.73 | 6.13 | 6.60 | 7.33 | 7.34 | 7.35 |
| | | mg/l Mn | 1680 | 1430 | 1150 | 116 | 107 | 93 |
| | | mg/l Mg | 4130 | 4270 | 4200 | 1410 | 1320 | 1320 |
| 12.6 | 740 | pH | 3.89 | 6.37 | 6.88 | 7.93 | 8.01 | 8.51 |
| | | mg/l Mn | 1670 | 1280 | 953 | 11 | 6.7 | 3.7 |
| | | mg/l Mg | 3820 | 4070 | 4090 | 125 | 92 | 67 |

The addition of limestone, to a pH range of 6.6 to 7.1, had precipitated almost half of the manganese, to the range 813 to 1150 mg/l. The addition of the lime, in increasing dosages, removed progressively more manganese, to less than 5 mg/l at the highest addition. This was, however, once again at the expense of a large excess of lime and with considerable co-precipitation of magnesium. When the prior precipitation of some of the manganese by limestone is taken into consideration, the lime requirement for removing the remaining manganese to the trace levels corresponded to almost thirteen times the theoretical amount.

Examples 1 to 3 show that traditional or conventional methods of precipitating metals from waste solutions or slurries using lime or the combination of limestone and lime are effective for removal of most of the metals to trace levels with economic and efficient utilization of the reagents. Removal of the manganese in the presence of magnesium, however, required a large excess of reagent above that theoretically required for the manganese, because of the non selectivity, and the unavoidable precipitation of major amounts of magnesium.

Example 4

This example describes a test conducted on a synthetic solution containing only manganese and magnesium, as their respective sulphates, using lime as the alkaline reagent, in an effort to establish the possibility of effecting a selective precipitation of the manganese. The solution, containing 2.01 g/l Mn and 3.15 g/l Mg, was treated at 85° C., with powdered calcium oxide, added incrementally, allowing a 30 min retention after each addition before sampling and addition of the next increment. Aeration of the slurry was maintained throughout die test The test data are given in Table 3.

TABLE 3

| CaO addition g/l | 0 | 0.5 | 1.0 | 1.5 | 2.0 | 2.5 |
|---|---|---|---|---|---|---|
| % of stoichiometric for Mn | 0 | 25 | 50 | 75 | 100 | 125 |
| Total time, min | 0 | 30 | 60 | 90 | 120 | 150 |
| Solution | | | | | | |
| pH (23° C.) | 4.31 | 7.51 | 7.66 | 7.58 | 7.66 | 8.72 |
| mg/l Mn | 2010 | 1540 | 1140 | 685 | 270 | 0.7 |
| g/l Mg | 3.15 | 2.93 | 2.92 | 2.91 | 2.93 | 2.87 |

TABLE 3-continued

| Solids | | |
|---|---|---|
| % Mn | 30.2 | 26.3 |
| % Mg | 0.84 | 1.93 |
| Weight Ratio Mn:Mg | 36.0 | 13.6 |

Unlike the results of the first three examples with lime, a very efficient and highly selective precipitation of the manganese, to trace levels, was readily achieved in this example on the solution containing no metals other than the manganese and magnesium. The very low degree of magnesium co-precipitation is reflected by die analysis of the precipitated solids, which even after precipitation of the manganese to <1 mg/l, had contained 26.396 Mn and only 1.939% Mg.

Similar tests on this solution using MgO showed that this alkaline reagent was also capable of precipitating Mn to less than 1 mg/l.

Example 5

A barren acid laterite leach liquor, after prior recovery of the base metals by sulphide precipitation, was treated with limestone slurry, at 85° C., with addition of air, to neutralize the acid and precipitate most of the metals. The chemical composition of the barren solution which was the same as used in the tests of Example 3, was (g/l) 5.6 Al, 0.62 Cr, 0.02 Co, 0.0005 Cu, 0.53 Fe, 3.34 Mg, 1.86 Mn, 0.08 Ni, 0.03 Zn and 8.7 $H_2SO_4$. The resultant solution, after limestone treatment arid removal of the precipitated metal hydroxides and gypsum by filtration contained (mg/l) <0.2 Al, <0.1 Cr, 0.9 Co, <0.5 Cu, <0.5 Fe, 618 Ca, 960 Mn and 4350 Mg, and had a pH of 7.01.

A batch test was then conducted on die essentially solids-free solution at 85° C., using a procedure similar to that of Example 4, with the addition of lime staged at 30 min intervals.

The results of this test are given in Table 4.

TABLE 4

| CaO addition g/l | 0 | 0.25 | 0.50 | 0.75 | 1.00 | 1.25 | 1.50 | 1.75 |
|---|---|---|---|---|---|---|---|---|
| % of stoichiometric for Mn | 0 | 26 | 51 | 77 | 103 | 128 | 154 | 180 |
| Total time, min | 0 | 30 | 60 | 90 | 120 | 150 | 180 | 210 |
| Solution | | | | | | | | |
| pH (23° C.) | 7.01 | 6.89 | 7.30 | 7.12 | 7.14 | 7.11 | 7.45 | 8.46 |
| mg/l Mn | 955 | 691 | 569 | 443 | 298 | 175 | 59 | 2 |
| g/l Mg | 4.35 | 3.86 | 3.98 | 3.94 | 3.92 | 4.06 | 4.14 | 4.14 |
| Solids | | | | | | | | |
| % Mn | | | | | | 24.5 | 23.6 | 19.6 |
| % Mg | | | | | | 0.56 | 0.57 | 0.85 |
| % Ca | | | | | | 17.2 | 17.8 | 16.2 |
| Weight Ratio Mn:Mg | | | | | | 43.8 | 41.4 | 23.1 |

Once again, a highly effective precipitation of the manganese was obtained, with considerably less excess lime than required in the previous tests on solids-containing barren solution and slurries. The molar ratio of Mn plus Mg relative to Ca in the precipitated solids was close to unity, indicating an efficient utilization of the lime. The low Mg content of the solids, relative to that of Mn, once again reflects a high degree of selectivity.

Example 6

The test of Example 5, on the limestone treated, solids-free solution was repeated, also at 85° C., with die exception that in this test, a bulk addition of CaO, of 2 g/l, was made at the start, and kinetic samples were taken over a period of 2 hours. The results of this test are given in Table 5.

TABLE 5

| Time, min | Feed | 15 | 30 | 45 | 60 | 90 | 120 |
|---|---|---|---|---|---|---|---|
| Solution | | | | | | | |
| pH (23° C.) | 7.01 | 8.37 | 8.50 | 8.37 | 8.07 | 8.38 | 8.53 |
| mg/l Mn | 955 | 534 | 354 | 101 | 14 | 1.5 | 0.6 |
| g/l Mg | 4.35 | 3.84 | 3.89 | 4.02 | 4.07 | 4.07 | 4.14 |

TABLE 5-continued

| Time, min | Feed | 15 | 30 | 45 | 60 | 90 | 120 |
|---|---|---|---|---|---|---|---|
| Solids | | | | | | | |
| % Mn | | 14.4 | 17.8 | 22.6 | 18.7 | 19.4 | 17.2 |
| % Mg | | 11.5 | 6.99 | 2.84 | 1.52 | 1.33 | 1.29 |
| Weight ratio Mn:Mg | | 1.25 | 2.55 | 7.96 | 12.3 | 14.6 | 13.3 |

This test shows that initially, the lime had precipitated mostly magnesium; the 15 min sample solids indicate a molar ratio of Mg:Mn of almost 2:1. With time, however, the precipitated magnesium exchanged with the remaining manganese in solution, with redissolution of die magnesium and precipitation of the manganese to <1 mg/l, and upgrading of die Mn:Mg ratio in the precipitated solids, from the 15 min value of 1.25:1, to almost 15:1 by the time die manganese had been precipitated to trace levels.

This shows die selectivity of manganese precipitation possible from a solution free of precipitate(d hydroxides of the previously removed metals. It also shows a time dependence for the exchange of precipitated magnesium for manganese.

Example 7

In this batch test an acidic barren solution, containing (g/l) 0.99 Al, 0.03 Cr, 0.46 Fe, 15.3 Mg and 3.44 Mn, was treated with a single addition of limestone, to pH 5.3, with aeration, at 40° C. After limestone addition, it contained <50 mg/l Al, <3 mg/l Cr, 356 mg/l Fe, 15.0 g/l Mg and 3.39 g/l Mn. The limestone-treated product slurry was divided into two portions, with one portion treated directly, with a single addition of lime (Case A) and the other portion filtered to remove the limestone-precipitated hydroxides and gypsum prior to die single addition of lime (Case B). The amount of lime added in both cases was theoretically equivalent to 200% of the manganese content of the solution following the limestone addition. A kinetic study was conducted after addition of the lime, with aeration maintained throughout, and the results are given in Table 6.

TABLE 6

| Case | Time, min | 0' | 15" | 30 | 60 | 90 | 120 |
|---|---|---|---|---|---|---|---|
| A | Sol'n | | | | | | |
| | pH (23° C.) | 5.32 | 6.98 | 7.24 | 7.47 | 7.48 | 7.48 |
| | g/l Mn | 3.39 | 1.11 | 1.08 | 1.07 | 1.02 | 0.98 |
| | g/l Mg | 15.0 | 13.2 | 13.2 | 13.2 | 13.2 | 13.1 |
| B | Sol'n | | | | | | |
| | pH (23° C.) | 5.57 | 8.27 | 8.00 | 7.96 | 7.87 | 7.95 |
| | g/l Mn | 3.33 | 0.97 | 0.90 | 0.68 | 0.50 | 0.32 |
| | g/l Mg | 15.1 | 14.1 | 13.8 | 13.6 | 14.4 | 14.5 |

*after limestone treatment, but prior to filtration and/or lime addition
**this and all subsequent times refer to retention time after lime addition Based oil the solution analyses at 15 min, the lime addition had precipitated about 2 g/l Mn, and between 1 and 2 g/l Mg, the corresponding molar ratio of precipitated metals indicates, as in tie test of Example 6, an initial preferential precipitation of magnesium.

In Case A, where the limestone-precipitated solids had not been removed prior to the addition of lime, there was only marginal additional precipitation of manganese after tie initial addition, with extended retention time. In Case B, however, the precipitated magnesium steadily exchanged for die remaining manganese in solution, reducing the concentration of Mn to 320 mg/l after 2 hours, in contrast to 980 mg/l in Case A. In comparison with the tests of the previous examples, conducted at about 85° C., this exchange and continued precipitation of die manganese was slower at 40° C. It is expected that with additional retention time, the removal of the manganese in Case B would have also continued to low or trace levels.

Example 8

A series of tests was conducted on a synthetic solution, containing 2 g/l Mn and 12 g/l Mg as their respective sulphates, to determine the effect of temperature and lime dosage on die kinetics and selectivity of manganese precipitation with lime. The tests were conducted with a single stage addition of the lime, with aeration and agitation maintained throughout each test. The results are given in Table 7.

TABLE 7

| Temperature, ° C. | 27 | 23 | 50 | 80 | 80 |
|---|---|---|---|---|---|
| % of Stoich CaO for Mn | 140 | 202 | 140 | 122 | 147 |
| Solution Mn, g/L | | | | | |
| Feed | 1.98 | 1.98 | 1.98 | 1.90 | 1.90 |
| 15 min | 0.64 | 0.35 | 0.88 | 0.70 | 0.68 |
| 30 | 0.61 | 0.33 | 0.62 | 0.38 | 0.14 |
| 60 | 0.58 | 0.30 | 0.13 | 0.25 | 0.025 |
| 120 | 0.48 | 0.21 | 0.0019 | 0.13 | 0.0015 |
| 180 | 0.37 | 0.14 | <0.0005 | 0.10 | 0.0021 |
| 240 | 0.23 | 0.096 | | | |
| 300 | 0.15 | 0.049 | | | |
| 360 | 0.11 | 0.026 | | | |
| Solids Mn:Mg Wt. Ratio | | | | | |
| 15 min | 3.7 | 2.3 | 2.3 | 4.5 | 3.3 |
| Final | 11.2 | 3.0 | 9.1 | 38.5 | 14.5 |

The results show that manganese can be selectively precipitated to low levels over the temperature range from about 25 to 80° C., as long as sufficient lime and retention time are provided.

At about 27° C., 140% stoichiometric lime addition brought the manganese down to 110 mg/L after six hours. Increasing the lime addition to 202% of stoichiometric increased the manganese precipitation rate but the solution still contained 26 mg/L Mn after six hours. Additional lime and/or more retention would be required to precipitate the Mn to <5 mg/L. At both 80 and 50° C., the manganese was readily precipitated to 2 mg/l, or less with about 140 to 150% stoichiometric lime.

Example 9

Several tests were conducted to evaluate the effect of aluminum concentration in the feed solution on reagent requirements and selective manganese precipitation. The tests were conducted at 80° C., with aeration, on a solution containing 5 g/l $H_2SO_4$, 2 g/l Mn, 12 g/l Mg, and various concentrations of aluminum, ranging from 1 to 5 g/l. Two of the test solutions, at 3 g/l Al, also contained either iron or chloride ions. Limestone was added, in a single stage, to precipitate the aluminum, and this was followed by staged, incremental addition of lime, without prior removal of the precipitated aluminum. The results are summarized in Table 8, and include the amount of lime required to precipitate the manganese to less than 10 mg/l.

TABLE 8

| Feed Solution Al, g/L | 0 | 1.07 | 3.15 | 3.20* | 3.33** | 5.09 |
|---|---|---|---|---|---|---|
| % of Stoichiometric CaO for Mn to achieve <10 mg/L Mn Corresponding Final Solids | 147 | 415 | 755 | 716 | 667 | 1232 |
| Mg:Al Mole Ratio | — | 2.48 | 1.81 | 1.79 | 1.83 | 1.84 |
| Mg:Mn Weight Ratio | 0.05 | 1.36 | 3.03 | 2.67 | 3.03 | 4.90 |

*feed solution also contained 3.54 g/L $Fe^{2-}$
**feed solution also contained 12.3 g/L $Cl^-$ The results show that with increased aluminum in the feed solution and, consequently, in the limestone-precipitated solids, increased lime was required to precipitate manganese to low levels (10 mg/L, Mn or less). The results of the solutions containing (in addition to the 3 g/l Al) iron (at 3.5 g/l ferrous iron) or chloride ion (at 12.3 g/l) were similar to those obtained in their absence, indicating no additional interference by these species on manganese precipitation.

The excess lime addition precipitated magnesium which, instead of in turn precipitating manganese, was apparently tied up with the limestone-precipitated aluminum. In all of the aluminum-containing systems, the Mg:Al mole ratios in the precipitated solids reached about 1.8:1 before the manganese had been precipitated to lie target levels.

The co-precipitation of magnesium is reflected by the increased solids Mg:Mn weight ratios with increased aluminum in the feed solutions. It is interesting to note that, at the initial aluminum concentrations of 1, 3 and 5 g/l, in the feed solution, the corresponding Mg:Mn weight ratios in the precipitated solids, for achieving <10 mg/L Mn for this particular solution system, were approximately 1:1, 3:1 and 5:1. This would indicate that for aluminum-containing solutions, it should be possible to estimate the amount of excess lime requirement, based on die initial aluminum content of the solutions.

Example 10

Several tests were conducted on synthetic manganese and magnesium sulphate-containing solutions which did not contain aluminum, but did contain other metals such as iron and chromium, to determine the impact of these metals on manganese precipitation behavior with lime. The conditions and results of these tests are summarized in Table 9, along with the results from several tests on solutions which had contained no metals other than the manganese and magnesium, for comparison. As before, the tests were at 80° C., with aeration, with a single stage addition of limestone, followed by a single stage addition of lime, without an intermediate solids/liquid separation stage.

TABLE 9

| Feed Solution | | | | | |
|---|---|---|---|---|---|
| pH | 7.20 | 6.87 | 1.18 | 1.51 | 1.38 |
| Other metal, g/l | none | none | 2.59 $Fe^{3-}$ | 3.69 $Fe^{2-}$ | 0.41 $Cr^{3-}$ |
| After Limestone Add_n | | | | | |
| pH | 7.20 | 6.87 | 6.69 | 7.16 | 5.76 |
| Mg, g/l | 11.9 | 11.9 | 12.6 | 13.0 | 13.2 |
| Mn | 1.90 | 1.90 | 1.54 | 1.87* | 2.01 |
| % Stoich CaO for Mn | 122 | 147 | 163 | 134 | 125 |
| Solution Mn, g/l | | | | | |
| 15 min | 0.70 | 0.68 | 0.050 | 0.125 | 0.94 |
| 30 | 0.38 | 0.14 | 0.017 | 0.025 | 0.32 |
| 60 | 0.25 | 0.025 | 0.0036 | 0.0024 | 0.17 |
| 120 | 0.13 | 0.0015 | 0.0013 | 0.0006 | 0.069 |
| 180 | 0.10 | 0.0021 | <0.0005 | 0.0006 | 0.011 |
| Solids Mn:Mg (wt ratio) | | | | | |
| 15 min | 4.5 | 3.3 | 10.0 | 9.1 | 3.0 |
| Final (3 hours) | 38.5 | 14.5 | 4.0 | 11.1 | 25.0 |

*solution contained approximately 100 mg/L Fe after limestone addition, prior to lime addition In the absence of aluminum, selective manganese precipitation was readily achieved, without the massive requirement of excess lime, in all of the tests. Unlike the case of aluminum, therefore, the presence of ferric or ferrous iron, or of chromic chromium did not interfere with manganese precipitation.

The rate data show that, at comparable lime additions, the precipitation of the manganese in the system containing the chromic chromium was comparable to or, possibly, slightly more effective than in the absence of chromium. In the case of the tests on the iron containing solutions, the precipitation of the manganese was markedly enhanced, with both the ferric and ferrous systems achieving <1 mg/L, Mn, and showing better kinetics. In the case of the ferric system, a portion of this effect may have been due to a slightly larger excess of lime. In the ferrous system, however, the lime addition had actually been considerably less, but the kinetics and extent of manganese were most favorable, achieving 0.6 mg/L, Mn within 90 min (2.4 mg/L at 60 min) with only about 34% excess lime.

It is not known whether the enhanced removal of manganese in die iron-containing systems was due to co-precipitation or adsorption by iron precipitates. Without being bound by the same, it appears that the presence of residual ferrous iron in solution after the limestone precipitation stage may be beneficial and advisable, provided that precipitated solids containing aluminum are removed prior to addition of die lime.

Example 11

During the acid pressure leaching of laterites, a significant portion of die aluminum is initially dissolved but, under the pressure leach conditions, is subsequently precipitated, and reports to die residue, primarily as an alunite. The preceding examples have shown that aluminum precipitated under atmospheric conditions from the barren solutions has a deleterious effect on the selective precipitation of manganese with lime. To determine whether aluminum which had been precipitated in the autoclave would also interfere with the precipitation of die manganese, two neutralization/precipitation tests were conducted, at 50° C. and 80° C., on a slurry made up of alunite-containing leach residue and aluminum-free manganese and magnesium sulphate solution.

The feed solids for die test work was a sample of laterite leach residue, as a final wash thickener underflow slurry from a process development campaign. The solids contained only aluminum precipitated under autoclave conditions, and the associated solution in the thickener underflow slurry contained no soluble aluminum.

The chemical composition of the solids was (%) 2.1 Al, 0.13 Ca, 0.8 Cr, 23 Fe, 0.27 Mg, <0.1 Mn, 48.8 $SiO_2$, and 2.2 S. The sulphur content of the washed solids, above and beyond that which may have been present as gypsum, represented a S:Al molar ratio of about 0.8:1.

The test slurry for the manganese precipitation tests comprised a blend of 0.5 L, of the underflow slurry (37.4% solids, designated as APL) and 1.35 L of a synthetic aluminum-free sulphate solution containing 2.49 g/L Mn and 16.1 g/L Mg, such that the blend contained 1.91 g/L Mn and 12.4 g/L Mg in solution and 140 g of residue solids per liter of solution. At that solids content, the residue represented an equivalent or potential aluminum content in solution of about 2.9 g/L. The results are summarized in Table 10, along with those of two tests which had been on aluminum-free solutions alone and one test on a 3 g/L Al-containing solution which had been neutralized with limestone, but without removal of the precipitated aluminum prior to the precipitation of the manganese.

TABLE 10

| Feed Solution/ Slurry | Solution alone | | Slurry after limestone addition | | Solution with APL residue | Solution with APL residue |
|---|---|---|---|---|---|---|
| Al in solids as g/l sol'n Feed/Entrained sol'n | 0 | 0 | 3.2 | 3.2 | 2.9 | 2.9 |
| Al, g/l | 0 | 0 | <0.001 | | <0.001 | <0.001 |
| Mn, g/l | 1.90 | 1.98 | 1.78 | | 1.91 | 1.96 |
| Mg, g/l | 11.9 | 12.7 | 12.7 | | 12.4 | 12.6 |
| Test Temp. ° C. | 80 | 50 | 80 | | 80 | 50 |
| % of stoich. CaO add'n* | 147 | 140 | 545 | 755 | 149 | 146 |
| Hot Slurry pH | 7.76 | 8.46 | 6.36 | 7.09 | 7.24 | 8.05 |
| Sol'n Analysis | (2 h) | (2 h) | (5 h) | (6 h) | (2 h) | (2 h) |
| pH (cold filtrate) | 8.96 | 8.59 | 6.78 | 7.48 | 8.35 | 8.68 |
| Mn, g/l | 0.002 | 0.002 | 0.28 | 0.016 | 0.44 | 0.29 |
| Mg, g/l | 12.4 | 12.8 | 8.13 | 6.32 | 11.6 | 11.7 |
| Solids Mg:Mn (wt ratio) | 0.07 | 0.11 | 2.49 | 3.03 | 0.69 | 1.23 |

*Based on manganese content of solution prior to lime addition

In the first two tests, on aluminum-free solutions alone, a 40 to 50% excess of lime was effective for a very selective precipitation of the manganese, to 2 mg/L, with weight ratios of Mg:Mn in the precipitated solids of only 0.07:1 and 0.11:1. In the presence of the 3 g/L Al precipitated by limestone, manganese removal was far less efficient, and an excess of even 655% of lime precipitated the manganese only to 16 mg/L with a corresponding solids Mg:Mn weight ratio of 3:1. (An excess of 864% lime removed the Mn to 1.4 mg/L). The two tests on the slurries containing tie laterite leach residues indicated that the presence of tie autoclave-precipitated aluminum was far less deleterious than that of the atmospherical-precipitated aluminum, although the contained aluminum did have a marginally harmful effect With 46 to 48% excess lime, the manganese precipitation had not been as efficient as in the absence of aluminum, with residual levels of 440 and 290 mg/L, respectively, at 80 and 50° C. It is expected that a slightly higher excess of lime (~100%) may have removed the manganese to <5 mg/L. It is also noteworthy that the test at 80° C. was less efficient than the one at 50° C. This would suggest a higher degree of decomposition of the alunite or other aluminum-containing solids in the pressure leach residue by the lime at the higher temperature.

All publications mentioned in this specification are indicative of the level of skill of those skilled in the art to which this invention pertains. All publications are herein incorporated by reference to the sane extent as if each individual publication was specifically and individually indicated to be incorporated by reference.

The terms and expressions used in this specification are used as terms of description and not of limitation. There is no intention, in using such terms and expression of excluding equivalents of die features shown and described, it being recognized that the scope of the invention is defined and limited only by the claims which follow.

We claim:

1. A process for selectively precipitating and removing manganese relative to magnesium from an acidic solution containing manganese, magnesium, and aluminum, comprising:
    a) adding a first alkaline reagent to neutralize the acidic solutions and to precipitate a majority of the aluminum as aluminum-containing solids, without precipitating a substantial amount of the magnesium;
    b) removing the precipitated aluminum-containing solids to create an aluminum-depleted solution;
    c) adding a second alkaline reagent to the aluminum-depleted solution and aerating for a sufficient retention time to preferentially precipitate a majority of the manganese as manganese-containing solids; and
    d) removing the precipitated manganese-containing solids.

2. The process of claim 1, wherein the total amount of the first and second alkaline reagents needed to precipitate the majority of the manganese is less than an amount which would be needed without first precipitating and removing the majority of the aluminum.

3. The process of claim 2, wherein the acidic solution is substantially barren of one or more of cobalt, nickel, copper and Zinc.

4. The process of claim 3, wherein the acidic solution is substantially barren of cobalt and nickel.

5. The process of claim 2, wherein the acidic solution contains magnesium in an amount ≧3.0 g/l, manganese in an amount ≧0.5 g/l, and aluminum in an amount ≧0.5 g/l.

6. The process of claim 3, wherein the acidic solution contains magnesium in the range of 3.0 to 50 g/l, manganese in the range of 0.5 to 5.0 g/l, and aluminum in the range of 0.5 to 8.0 g/l.

7. The process of claim 5, wherein step a) is conducted at a pH sufficient to precipitate and reduce the aluminum to less than 0.5 g/l.

8. The process of claim 6, wherein step a) is conducted at a pH sufficient to precipitate and reduce the aluminum to less than 0.1 g/l.

9. The process of claim 2, wherein the pH in step a) is in the range of 3.5 to 7.0.

10. The process of claim 5, wherein the pH in step a) is in the range of 4.0 to 5.5.

11. The process of claim 7, wherein the pH in step a) is in the range of 3.5 to 5.0.

12. The process of claim 8, wherein the pH in step a) is in the range of 4.0 to 7.0.

13. The process of claim 2, wherein the pH in step c) is in the range of 7.0 to 9.0.

14. The process of claim 5, wherein the pH in step c) is in the range of 7.5 to 8.5.

15. The process of claim 11, wherein the pH in step c) is in the range of 7.0 to 9.0.

16. The process of claim 12, wherein the pH in step c) is in tie range of 7.5 to 8.5.

17. The process of claim 15, wherein die first alkaline reagent provides one or more of an oxide, hydroxide or carbonate of one or both of calcium or magnesium.

18. The process of claim 16, wherein the first alkaline reagent is one or both of lime or limestone.

19. The process of claim 17, wherein the second alkaline reagent provides on or more of an oxide or hydroxide of one or both of calcium or magnesium, sodium carbonate or sodium hydroxide.

20. The process of claim 18, wherein the second alkaline reagent is lime.

21. The process of claim 6, wherein the first alkaline reagent is one or more of lime or limestone, and wherein the second alkaline reagent is lime.

22. The process of claim 19, wherein step a) is conducted with gas sparging to dispel any formed carbon dioxide.

23. The process of claim 22, wherein the gas sparging is with air or an oxygen-containing gas to oxidize ferrous iron.

24. The process of claim 19, wherein the acidic solution is at a temperature in the range of 23 to 95° C.

25. The process of claim 19, wherein the acidic solution is at a temperature in the range of 40 to 80° C.

26. The process of claim 19, wherein die acidic solution also contains one or both of iron in the range of 0.1 to 5.0 g/l and chromium in the amount of 0.1 to 1.5 g/l.

27. The process of claim 25, wherein the acidic solution is an effluent stream from an acid leaching process.

28. The process of claim 26, wherein the process is conducted at atmospheric pressure.

29. The process of claim 5, wherein the acidic solution contains ferrous iron, which is co-precipitated with the manganese-containing solids.

30. The process of claim 28, wherein the acidic solution contains ferrous iron, which is co-precipitated with the manganese-containing solids.

\* \* \* \* \*

UNITED STATES PATENT AND TRADEMARK OFFICE
CERTIFICATE OF CORRECTION

PATENT NO.    : 6,656,247 B1
DATED         : December 2, 2003
INVENTOR(S)   : Genik-Sas-Berezowsky et al.

It is certified that error appears in the above-identified patent and that said Letters Patent is hereby corrected as shown below:

Column 5,
Line 54, please replace "tie" with -- the --.

Column 6,
Lines 18 and 64, please replace "tie" with -- the --.
Lines 53, 60 and 65, please replace "die" with -- the --.

Column 7,
Line 15, please replace "aid" with -- and --.
Lines 18, 40, 46 and 53, please replace "die" with -- the --.
Line 30, please replace "Mu-Mg" with -- Mn-Mg --.

Column 8,
Lines 10 and 17, please replace "die" with -- the --.
Line 46, please replace "an(d" with -- and --.

Column 9,
Lines 14 and 45, please replace "die" with -- the --.
Line 15, please replace "tie" with -- the --.
Line 47, both occurrences, please replace "die" with -- the --.

Column 11,
Lines 8 and 58, please replace "die" with -- the --.

Column 12,
Line 2, please replace "26.396" with -- 26.3% --.
Line 3, please replace "1.939%" with -- 1.93% --.
Line 17, please replace "arid" with -- and --.
Lines 21 and 55, please replace "die" with -- the --.

UNITED STATES PATENT AND TRADEMARK OFFICE
CERTIFICATE OF CORRECTION

PATENT NO.   : 6,656,247 B1
DATED        : December 2, 2003
INVENTOR(S)  : Genik-Sas-Berezowsky et al.

It is certified that error appears in the above-identified patent and that said Letters Patent is hereby corrected as shown below:

Column 13,
Lines 16, 18, 19, 21 and 37, please replace "die" with -- the --.
Line 22, please replace "precipitate(d" with -- precipitated --.
Line 46, please replace "0'" with -- 0 -- and replace "15" " with -- 15 --.
Line 59, please replace "oil" with -- on --.
Lines 62 and 66, please replace "tie" with -- the --.

Column 14,
Lines 13, 17 and 26, please replace "die" with -- the --.

Column 15,
Line 27, please replace "$Fe^{2-}$" with -- $Fe^{2+}$ --.
Line 43, please replace "lie" with -- the --.
Line 54, please replace "die" with -- the --.

Column 16,
Line 7, please replace "$Fe^{3-}$" with -- $Fe^{3+}$ -- and replace "$Fe^{2-}$" with -- $Fe^{2+}$ -- and replace "$Cr^{3-}$" with -- $Cr^{3+}$ --.
Lines 48, 54, 58, 60 and 66, please replace "die" with -- the --.

Column 17,
Line 4, please replace "die" with -- the --.
Line 16, please replace "0.5L, of" with -- 0.5L of --.
Line 21, please replace "liter" with -- litre --.
Lines 62 and 63, please replace "tie" with -- the --.
Line 66, please replace "effect With" with -- effect. With --.

Column 18,
Line 13, please replace "sane" with -- same --.
Line 19, please replace "die" with -- the --.
Line 46, please replace "Zinc" with -- zinc --.

UNITED STATES PATENT AND TRADEMARK OFFICE
CERTIFICATE OF CORRECTION

PATENT NO. : 6,656,247 B1
DATED : December 2, 2003
INVENTOR(S) : Genik-Sas-Berezowsky et al.

It is certified that error appears in the above-identified patent and that said Letters Patent is hereby corrected as shown below:

Column 19,
Line 10, please replace "tie" with -- the --.
Line 11, please replace "die" with -- the --.
Line 17, please replace "on or more" with -- one or more --.

Column 20,
Line 9, please replace "die" with -- the --.

Signed and Sealed this

Eighth Day of March, 2005

JON W. DUDAS
*Director of the United States Patent and Trademark Office*